US011344152B2

(12) United States Patent
Haas et al.

(10) Patent No.: US 11,344,152 B2
(45) Date of Patent: May 31, 2022

(54) DEVICE FOR PREPARING FOOD

(71) Applicant: HS2 Engineering GmbH, Ulm (DE)

(72) Inventors: Karl-Heinz Haas, Achstetten (DE);
Peter Huber, Setzingen (DE)

(73) Assignee: HS2 Engineering GmbH, Ulm (DE)

(*) Notice: Subject to any disclaimer, the term of this patent is extended or adjusted under 35 U.S.C. 154(b) by 284 days.

(21) Appl. No.: 15/981,529

(22) Filed: May 16, 2018

(65) Prior Publication Data
US 2018/0255967 A1 Sep. 13, 2018

Related U.S. Application Data

(63) Continuation of application No. PCT/EP2016/077609, filed on Nov. 14, 2016.

(30) Foreign Application Priority Data

Nov. 16, 2015 (DE) .................... 10 2015 119 742.1

(51) Int. Cl.
*A47J 36/38* (2006.01)
*B01D 46/00* (2022.01)
(Continued)

(52) U.S. Cl.
CPC .......... *A47J 36/38* (2013.01); *B01D 46/0093* (2013.01); *B01D 46/62* (2022.01);
(Continued)

(58) Field of Classification Search
CPC ................ A47J 45/10; A47J 2037/0617; A47J 2037/0795; A47J 2037/101; A47J 37/108;
(Continued)

(56) References Cited

U.S. PATENT DOCUMENTS 274,408 A 3/1883 Taylor
589,727 A 9/1897 Hoopes
(Continued)

FOREIGN PATENT DOCUMENTS

CA 2449600 A1 * 1/2005 .......... A47J 37/0641
DE 1596694 A1 2/1971
(Continued)

OTHER PUBLICATIONS

International Search Report dated Mar. 17, 2017 in corresponding application PCT/EP2016/077609.
(Continued)

*Primary Examiner* — Justin C Dodson
*Assistant Examiner* — Fahmida Ferdousi
(74) *Attorney, Agent, or Firm* — Muncy, Geissler, Olds & Lowe, P.C.

(57) ABSTRACT

An apparatus for preparing food having a heating device with hot plate, a filter device and a cover device, which is in operative connection with the filter device and has an upper side, an underside and side surfaces. The cover device, on the underside, has at least one entry opening of a flow channel for exhaust air, the flow channel being arranged in the interior of the cover device. The flow channel, on a first side surface, has an exit opening, wherein the exit opening can be positioned such that the exhaust air can flow via the exit opening into an entry opening of the filter device.

18 Claims, 5 Drawing Sheets

(51) Int. Cl.
*H05B 6/12* (2006.01)
*F24C 15/20* (2006.01)
*B01D 46/62* (2022.01)

(52) U.S. Cl.
CPC ....... *F24C 15/2042* (2013.01); *H05B 6/1209* (2013.01); *B01D 2279/35* (2013.01); *Y02B 40/00* (2013.01)

(58) Field of Classification Search
CPC ...... A47J 37/1276; A47J 37/128; A47J 36/10; A47J 36/06; A47J 36/00; A47J 27/0804; A47J 7/21175; A47J 27/21166
USPC ............... 219/621, 620, 622, 624, 386, 438, 219/452.12, 632; 220/573.1, 755; 99/331, 342, 450; 426/113, 19, 231
See application file for complete search history.

(56) References Cited

U.S. PATENT DOCUMENTS

| | | | |
|---|---|---|---|
| 2,555,694 A | | 6/1951 | Ihling |
| 4,505,194 A | * | 3/1985 | Bishop ................ A47J 37/1228 454/49 |
| 5,553,531 A | * | 9/1996 | Brown .................... A47J 27/04 99/340 |
| 2004/0187698 A1 | * | 9/2004 | Parenteau ............... A47J 45/10 99/337 |
| 2005/0223906 A1 | * | 10/2005 | Xu ....................... A47J 37/0641 99/348 |
| 2014/0034650 A1 | | 2/2014 | Thomaschewski et al. |

FOREIGN PATENT DOCUMENTS

| | | | |
|---|---|---|---|
| DE | 9311478 U1 | 9/1993 | |
| DE | 4423557 C2 | 2/2001 | |
| DE | 10146153 A1 | 4/2003 | |
| DE | 102005010002 A1 | 9/2006 | |
| DE | 202008012751 U1 | 2/2009 | |
| DE | 162608009249 A1 | 8/2009 | |
| DE | 102012213811 A1 | 2/2014 | |
| EP | 1296096 A2 * | 3/2003 | ............. F24C 15/20 |
| EP | 1296096 A2 | 3/2003 | |
| EP | 2062514 A1 | 5/2009 | |
| FR | 2761620 A1 | 10/1998 | |
| GB | 1118364 A | 7/1968 | |
| GB | 2116873 A | 10/1983 | |
| JP | 2003329277 A * | 11/2003 | ............. F24C 15/20 |
| WO | WO2006104318 A1 | 10/2006 | |

OTHER PUBLICATIONS

English Translation of German Office Action dated Jun. 29, 2016 issued by the German Patent Office.

\* cited by examiner

DEVICE FOR PREPARING FOOD

This nonprovisional application is a continuation of International Application No. PCT/EP2016/077609, which was filed on Nov. 14, 2016, and which claims priority to German Patent Application No. DE 10 2015 119 742.1, which was filed in Germany on Nov. 16, 2015, and which are both herein incorporated by reference.

BACKGROUND OF THE INVENTION

Field of the Invention

The present invention relates to an apparatus for preparing food according.

Description of the Background Art

On aircraft, food is usually prepared using special aircraft cooking equipment. For this purpose, aircrafts used for regular airline service have, for example, hot-air ovens for heating prepacked food. On customized aircraft, use is also made of cookware in the form of pots, pans and woks. It is often the case that these are fixed, together with a lid, on the cooktop via safety clips, a number of pots being secured at the same time by a guard rail. Fixing of the cookware is important so that, in the event of turbulence, hot food does not get into the cabin in an uncontrolled manner. These safety aspects mean that the design and the handling of aircraft cooking equipment have to meet specific requirements.

For example, DE 1 596 694 B1 discloses an appliance for heating food. This appliance comprises a housing which can be closed by means of a door and shields the surroundings from electromagnetic waves. The housing accommodates one or more functional floors, in which one or more induction coils are integrated in order for it to be possible for food accommodated in containers to be heated inductively for consumption purposes. In order to increase the operational reliability, a shielding element is present on functional-floor end surfaces which are oriented in the direction of the door opening of the housing. Each individual element is also connected to ambient potential or to ground potential, in order for it to be possible to ensure that the surroundings are shielded from electromagnetic waves, even when the housing door is open.

Furthermore DE 10 2012 213 811 A1, which corresponds to US 2014/0034650, discloses a piece of aircraft cooking equipment having an item of cookware and a lid which can be fixed to said item of cookware. The piece of aircraft cooking equipment can be fixed on a cooktop, wherein the lid has at least one movable element, which can be moved to expose one or more openings to the interior of the cookware. The cooktop may also be equipped with extractor hoods. Exposing the opening provides for access to the interior of the cookware. There is no need here for any guard rail or lid to be taken off or removed in any other way. Movement of the movable element suffices in order to provide temporary access to the food. The opening here gives access to the food. The access opening is large enough for it to be possible for example for ingredients to be added or for a cooking spoon to be introduced. The movable element can be configured in different ways, by being radially or tangentially displaceable. It can be displaced, for example, over part of a circular path or of a helical curve. A tangential movement direction is advantageous in particular for round pots, since this movement direction circumferentially follows the shape of the pot.

SUMMARY OF THE INVENTION

It is therefore an object of the present invention to provide an apparatus for preparing food.

In an exemplary embodiment, the invention provides an apparatus for preparing food, comprising a heating device with hot plate, a filter device and a cover device, which is in operative connection with the filter device and has an upper side, an underside and side surfaces. The cover device, on the underside, has at least one entry opening of a flow channel for exhaust air, the flow channel being arranged in the interior of the cover device. The flow channel, on a first side surface, has an exit opening, wherein the exit opening can be positioned such that the exhaust air can flow via the exit opening into an entry opening of the filter device.

The invention also uses the expression preparing food to cover the preparation of beverages or the heating of water. In this context, and in all other configurations of the invention, the term food is intended to cover any kind of item or produce which provides nourishment.

The invention relates to a cooktop, preferably for aircraft, or also other forms of transport, it being possible for the cooktop, in the form of a relatively small appliance, to be installed or inserted even in a restricted amount of space. Such a modular and mobile system here can be installed in a space-saving manner in a rack and connected to the electrical system onboard an aircraft. It is possible for the cooktop, in the form of an insert or table-top unit, to be operated directly as required in an aircraft. A heating device in the form of a flat hot plate is provided in order to prepare food. For practical reasons, the hot plate of the cooktop can be accessed directly by a user, preferably from the front, and the filter device is arranged in the form of a filter box behind the hot plate. The cover device here can be retained in a movable manner on the filter box.

The apparatus according to the invention has a filter device and a cover device, which is in operative connection with the filter device and is in the form of an integrated extractor hood. The operative connection resides in the fact that the fumes which arise during the preparation of food are guided through a flow channel within the cover device and exit through an exit opening located, for example, on an end side and, from there, flow directly into the filter device. This exit opening on the end side is therefore directly adjacent to the entry opening of the filter device. This first side surface on the end side may also have additional suitable components for guiding and forming the exhaust-air stream.

For every shape and size of cooking vessel, the cover device is designed such that, for the purpose of preparing food, it covers the cooking vessel in the manner of a lid. The entry opening for the exhaust air, said opening being present on the underside of the cover device, is therefore positioned on the cooking vessel, which is open in the upward direction.

In particular the different heights of the cooking vessels render it necessary for the cover device to be positioned in a flexible manner. It is possible here either for the cooking vessel to be completely closed or for a defined gap to remain, through which air can pass from the surroundings.

A variably adjustable distance between the cover device and the hot plate here means that the exit opening located on the end side can be guided along an elongate entry opening of the filter device.

If fresh air penetrates from the outside, this cools the exhaust air in the flow channel of the cover device to the extent where for example the fat entrained in the air stream is deposited on the wall. This desired effect means that even the wall of the flow channel gives a filter effect. The addition of fresh air also prevents overheating. Nevertheless, it is possible for temperature sensors or temperature-sensor switches to be present at suitable locations, said sensors or switches causing the apparatus to be switched off when predeterminable maximum temperatures are reached.

It is likewise possible for a smoke-detection sensor to be arranged in the exhaust-air channel. This safety aspect, in particular for the preparation of fried food, is intended to provide for early detection of flames in the interior of the cooking vessel.

The particular advantage of the invention resides in the fact that a compact and lightweight appliance, in particular in aircraft, provides for safe and convenient preparation of food. Undesirable or unpleasant odors are filtered out by the filter device. The cover device here performs multiple functions. It additionally serves as a splashguard, an extractor hood and to secure the cooking vessels. Straightforward fixing of the cooking vessel on the hot plate also means that preparation can be done using just one hand. As a result of efficient filtering of the exhaust air, the passengers are not adversely affected by unpleasant odors.

In an advantageous configuration of the invention, it is possible for the flow channel to cause multiple deflection of the exhaust-air stream at least in some regions between the entry opening and exit opening. Multiple deflections extend the path traveled by the exhaust air and, in conjunction with intended vortex formation, can cool the exhaust air to a sufficiently pronounced extent, even in the cover device, in order for fat to be deposited. Overall, such measures cool the exhaust air to such a pronounced extent that, following passage through the filter device, it can be expelled into the surroundings. Of course, for the purpose of cleaning the flow channel, the cover device can be straightforwardly dismantled and reassembled.

The flow channel can have a meandering design at least in some regions between the entry opening and exit opening. As a result, even the cover device provides a path of sufficient length, for the purposes of cooling the exhaust air and of depositing fat, until the actual filter device is reached.

It is also possible for the flow channel to have ribs, stub-like projections or grilles, for the purpose of deflecting the exhaust air, between the entry opening and exit opening. This means that, on the one hand, the path is extended for the exhaust air and, on the other hand, vortex zones are formed efficiently, an intensive exchange of heat with the channel wall taking place at said vortex zones so that fat is deposited early.

It is possible for a filter to be arranged in the flow channel. Additional filters assist the fat-depositing effect in the flow channel. It is also possible here for use already to be made of particle filters, in order for the exhaust-air stream to be precleaned.

The filter can be formed of metal wool or of open-pore metal foam. Such filter materials can also serve as a flame retardant and, as a result of their compactness, have a particularly efficient filter action. It is also possible for such reusable components to be cleaned for example in dishwashers.

In addition, it is also conceivable for an additional paper filter to be arranged, by means of a retaining device, in front of the entry opening. Such a paper filter—which may be designed preferably in the form of a disposable filter—helps to increase the service lives of the downstream filter units.

The cover device can be equipped with a flame barrier. Such barriers either can operate by way of locking mechanisms, which block the ignited exhaust-air stream, or formed of porous ceramic materials or of open-pore metal foam. Suitable temperature sensors and/or fire sensors here can detect temperatures exceeding critical temperatures and indicate a hazardous situation and/or intervene.

The cover device can be arranged at least such that it can be displaced in a parallel state in space. For parallel guidance, corresponding bearing locations, for example rails which slide one upon the other by means of ball bearings, can provide efficient, user-friendly assistance. It is possible for the cover device, in the form of a movable element, to be moved directly, for example via a handle fitted on the movable element, and positioned on the cooking vessel.

The cover device can be displaced, for example, between an open position and a closed position. In the open position, the vessels for preparing the food can be straightforwardly introduced or removed again. In the closed position, it is possible for the cover device, in the form of a movable element, to be lockable. The locking prevents the cover device from freeing a cooking vessel in an undesirable manner. For safety reasons, this is imperative particularly in air travel. It may also be desirable, for example in the case of certain flying maneuvers or in the event of turbulence, for an automatic locking mechanism which cannot be released in hazardous situations to be effective in the closed position. Acceleration or inclination sensors here help to detect the hazardous situation by way of threshold values. It is also possible, however, for the cover device to be designed such that, between the open position and the envisaged closed position, it can be fixed or arrested in any intermediate position.

The cover device can be subjected to spring force at least in the closed position. This gives rise to an automatic closure mechanism which applies the retaining force to the cooking vessel arranged beneath. It is possible here for a mechanical spring system to constitute a kind of safety device which reacts automatically in a hazardous situation as soon as the acceleration of the aircraft has dropped below a permissible threshold value. For this purpose, the aircraft cooking equipment preferably comprises an acceleration sensor and inclination sensor.

The cover device can be displaced in a parallel state by a multi-arm mechanism. Parallel displacement can cover the surface area of the opening of a cooking vessel directly and stabilize the vessel.

The multi-arm mechanism can fit laterally on the filter device and laterally on at least one of the side surfaces of the cover device. The cover device can therefore be pivoted in a parallel state over the filter device in order thus to free the opening of a cooking vessel.

The cover device can additionally be pivoted about at least one axis. This can make it even easier for the upper opening of a cooking vessel to be freed in order to provide access to the food. Pivoting can also straightforwardly provide access to the underside with the entry opening for the exhaust air. This may possibly be expedient for cleaning of the underside.

The filter device can have a fan for generating an exhaust-air stream. The fan can preferably also be regulated, in order for it to be possible for the intensity of the exhaust-air stream to be controlled as required.

The filter device can have a plurality of filters arranged one behind the other in the flow direction. This means that filters with different functions can be combined. For example, a fat-separation stage can be followed, in a downstream position as seen in relation to the exhaust-air stream, by a particle filter and then by a carbon filter, for the complete removal of unpleasant odors. Such three-stage filters, or even four-stage filters including fat separation, are particularly efficient.

Each filter can be individually interchangeable. The filters are fixed in the filter device by a retainer such that they can be straightforwardly removed or inserted. In addition to disposable filters, it is also possible to use cleanable filters.

In addition, it is also possible to provide an integrated design filter cassette, which, in the form of a structural unit, comprises all the filters associated with the filter device. In this case, it is advantageously possible for the entire cassette to be removed as one from the arrangement. The then improved accessibility to the individual filters means that the maintenance of the filter unit, or a changeover of individual filters, is considerably simplified.

The hot plate can have an inductive heater. The inductive heater can be controlled by means of near-field communication NFC or by other suitable control devices. The amount of energy required for NFC control is merely in the range of a few watts. The electronics and control technologies are designed so that little power is required. User and control displays allow the user to select the generator power for the inductive coils by way of a preset time on an operating panel. Modern operating panels allow settings to be made by means of direct selection or by means of so-called sliders operated by means of a swiping movement performed by a finger.

A cooking vessel can be capable of being arranged between the hot plate and the cover device. The overall arrangement and dimensioning of the apparatus is intended to allow the use of different cooking vessels. Flat as well as large-volume and high vessels fit between the flexible-arrangement cover device and the hot plate.

The cooking vessel can be a pan, a pot, a wok, a steam cooker or an apparatus for preparing rice.

Cooking vessels, and in particular pans, can be formed of materials which are protected against overheating. These materials have a Curie point for example between 200° C. and 250° C., above which the material is no longer magnetic and thus prevents overheating. The safety of the system can thus be increased by the physical properties of the material itself, as well as by control and regulation of the cooktop.

Further cooking vessels which are tailored to requirements are the so-called Inductive Apps. These are pieces of cooking equipment which, as seen in relation to the inductive cooktop itself, have additional control electronics and additional inductive components and temperature sensors. Inductive Apps are supplied with power inductively and wirelessly; data transmission also takes place wirelessly. For this purpose, Inductive Apps have their own, dedicated controller, in order to achieve intuitive use along with an optimum cooking result and service quality. Examples of Inductive Apps are toasters, rice cookers, woks and steam cookers. However, it is also possible for other kitchen appliances, such as coffee machines and kettles, to function on this basis. Such additional equipment gives rise to versatile and effective use of the limited working area in an aircraft kitchen and provide for flexible catering operations. For example a rice cooker has a capacity of approximately 2.5 l and automatically prepares rice, soup and further dishes in a cooking vessel. It is thus also possible to fry meat, fish, eggs and vegetables to high standards.

It is advantageously possible for a toaster device to be capable of being arranged between the hot plate and the cover device. The toaster device is a further example of an Inductive App, which is heated indirectly by a secondary coil. The secondary coil heats the actual heating elements via an NFC control circuit. An intelligent time-controller can be used to prepare a number of slices of toast to the desired stages of browning. It is also the case that a toaster device is docked to the exhaust-air system of the filter device, and this makes it possible for the interior of the appliance and the outer walls to be actively cooled. The Inductive Apps described make it possible to minimize the amount of power required and the overall weight of the aircraft kitchen with a high level of energy efficiency and versatile use of the cooking appliances. Inductive Apps can be stowed at suitable locations when not in use.

For the identification of the respective insert element, electromagnets or induction coils can be switched on just for a brief time for detection purposes and identification takes place by detection of the either present or absent electromagnetically detectable element.

It is advantageously possible for the cooking vessel or the toaster device to be capable of being arrested on the heating device and/or the filter device and/or on the cover device, and released again, by a retaining system. The cookware can preferably be fixed on the hot plate by a form-fitting connection. The form-fitting connection is realized preferably by a thread, a holding-down component or a quick-locking mechanism. The form-fitting connection can also comprise a bayonet closure or pins. This fixing takes place preferably in the first instance independently of the cover device functioning as a lid. This means that the cookware is already reliably secured even when a cover device is in the open position. It is also possible, however, for the cookware to be secured solely or in addition by the cover device in the closed position.

It is possible for the Inductive Apps, in the form of insert elements, to be precharged with food prior to the actual heating operation and, if required, fed to the induction oven, wherein the food can then be heated within a very short period of time, i.e. within a few minutes.

In an advantageous configuration of the invention, it is possible for the cover device, in the closed position, to arrest the cooking vessel or the toaster device. An additional lateral arrester, which can be pivoted preferably via an access, may be advantageous provided on the filter device or on the heating device.

It is advantageously possible for the cover device to contain a further flow channel for supply air with an entry opening on the underside of the cover device, this allowing outside air to be fed in. Additional fresh air is thus introduced into the exhaust-air stream, and the latter is cooled as a result. This is an important safety aspect: achieving a sufficiently low temperature in the exhaust-air stream as quickly as possible.

It is advantageously possible, in the closed position, for at least one through-passage opening to be formed between the cooking vessel and the underside of the cover device. Through-passage openings likewise serve for feeding fresh air into the exhaust-air stream. These may be additional, usually annular attachments with apertures, which are positioned between the upper periphery of the cooking vessel and the underside of the cover device during cooking. The fresh-air stream is thus regulated via the size of the apertures. Variable-size apertures can also regulate the inflow of fresh air.

In an advantageous configuration of the invention, it is possible, in the closed position, for the at least one through-passage opening to be in the form of a gap or circle. This gives rise to window-like openings of which the surface areas can be possibly increased or decreased in order to regulate the air stream. Mutually displaceable double rings with through-passage openings which cover over one another can be used for this purpose.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
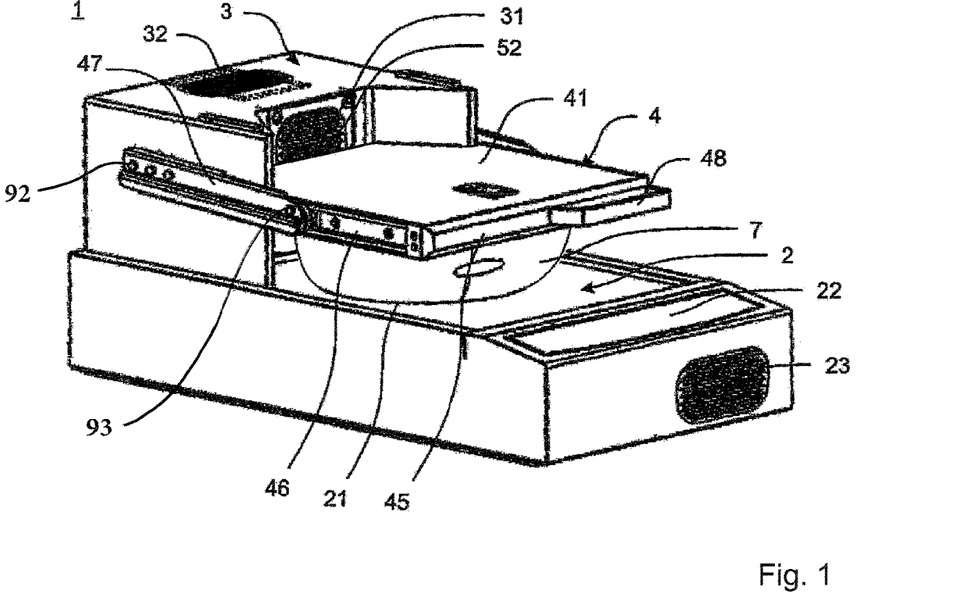
FIG. 1 shows, schematically, an oblique view of an apparatus for preparing food.

FIG. 1 shows, schematically, an oblique view of an apparatus 1 for preparing food. The lower part of the apparatus 1 forms the heating device 2 with the hot plate 21, having an operating panel 22 and a ventilation grille 23 for the feed of cooling air to the induction coil and control electronics.

The filter device 3 is arranged on the heating device 2, behind the hot plate 21. The entry opening of the filter device 31 is of elongate design in the vertical direction. The exhaust air from the cooking enters through said entry opening of the filter device 31 until being discharged again into the surroundings, in a filtered and odorless state, through the exit opening of the filter device 32.

The cover device 4 here is in the closed position and has been placed above the upper opening of a pan 7 forming the cooking vessel. Via an entry opening into a flow channel for exhaust air, said flow channel being formed within the cover device 4, the exhaust air passes into the entry opening of the filter device 31 via the exit opening of the flow channel 52. The exit opening of the flow channel 52 is positioned on a rear, first side surface of the cover device 4, said side surface no longer being visible in the closed position. A locking device 41 can preferably be used to dismantle the cover device 4, the flow channel located therein therefore being accessible for monitoring or cleaning purposes. The third side surface 45 has arranged on it a handle 48, by means of which the cover device 4 can be displaced from an open position into a closed position. On the fourth side surface 46, it is possible to see a multi arm mechanism in the form of a parallel pivoting arm 47, which subjects the cover device 4 to force in the closed position so as to fix the pan 7 to a sufficient extent. One end of the parallel pivoting arm 47 is pivotally connected to the filter device 3 at a third connection point 92 and the other end of the parallel pivoting arm 47 is pivotally connected to the fourth side surface 46 of the cover device 4 at a fourth connection point 93.

It can clearly be seen in FIG. 1 that the entry opening of the filter device 31 is of elongate design in the vertical direction and is covered usually only to some extent by the exit opening of the flow channel 52. This also allows comparatively cool outside air to enter into the filter device 3, so that the exhaust air coming from the cooking is efficiently cooled.

Figure 2:
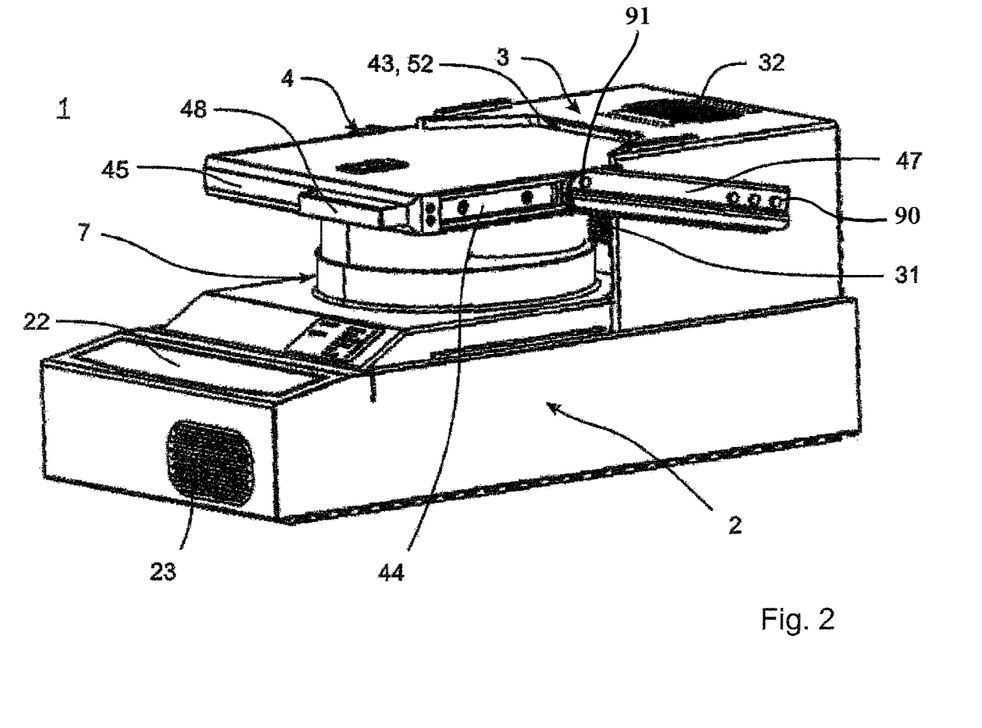
FIG. 2 shows, schematically, a further oblique view of an apparatus for preparing food with an additional cooking vessel.

FIG. 2 shows, schematically, a further oblique view of an apparatus 1 for preparing food with a rice cooker 7 forming the cooking vessel. It can be seen in this figure that the volume of the rice cooker 7, in the form of an Inductive App, means that said cooker has a greater height than a pan. As a result, the cover device 4, in the closed position illustrated, is arranged at a greater distance from the heating device 2. The parallel pivoting arm 47, shown here as attached to the second side surface 44 of the cover 4, makes this readily possible. In particular, one end of the parallel pivoting arm 47 is pivotally connected to the filter device 3 at a first connection point 90 and the other end of the parallel pivoting arm 47 is pivotally connected to the second side surface 44 of the cover device 4 at a second connection point 91. The exit opening of the flow channel 52 on the first side surface 43 of the cover device 4 is then still located directly in front of the entry opening of the filter device 31, as a result of which the exhaust air from the cover device 4 can flow, for cleaning purposes, into the filter device 3. In particular when the rice cooker 7 is designed with an induction compatible pot, it is possible for further components for thermally insulating the underside of the Inductive App to be present, it therefore also being possible for the Inductive App to be set down on heat sensitive surfaces once its contents have been heated.

Figure 3:
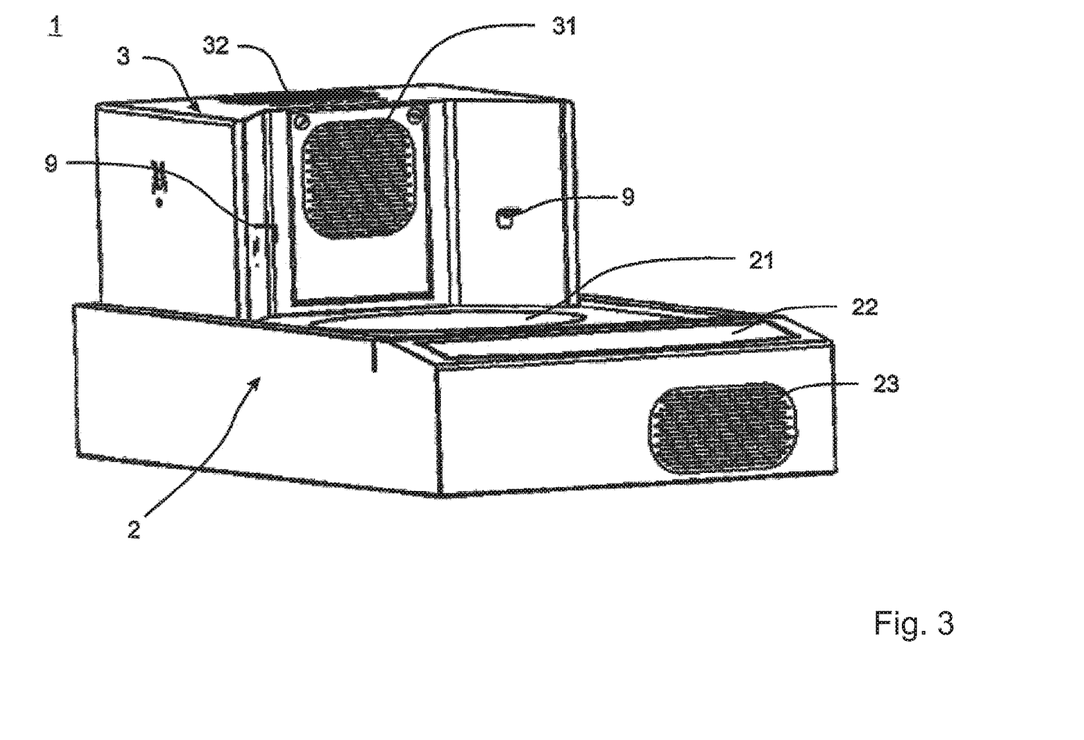
FIG. 3 shows, schematically, a front view of the heating device and of the filter device.

FIG. 3 shows, schematically, a front view of the heating device 2 and of the filter device 3 without the cover device. The entry opening of the filter device 31 is now visible, and it is dimensioned such that a height-adjustable cover device can be arranged with the exit opening for the exhaust air directly in front of it. During operation, the filter device 3 and the cover device are positioned at a minimal distance apart from one another, and it is therefore not possible for the exhaust air to flow outward in the transition region.

The inductive hot plate 21 of the heating device 2 can likewise be seen in FIG. 3. This, usually planar, cooktop is also suitable for all different base dimensions of cooking vessel.

The retaining system 9 ensures that a cooking vessel is arrested securely in place even prior to operation. The retaining system is constituted here by an angle bracket which is fastened on the filter device 3, engages for example in an upper opening of a pan and establishes the form-fitting connection. This fixing takes place preferably in the first instance independently of the cover device functioning as a lid. This means that the cookware is already reliably secured even when a cover device is in the open position. It is also possible, however, for the cookware to be secured solely or in addition by the cover device in the closed position.

Figure 4:
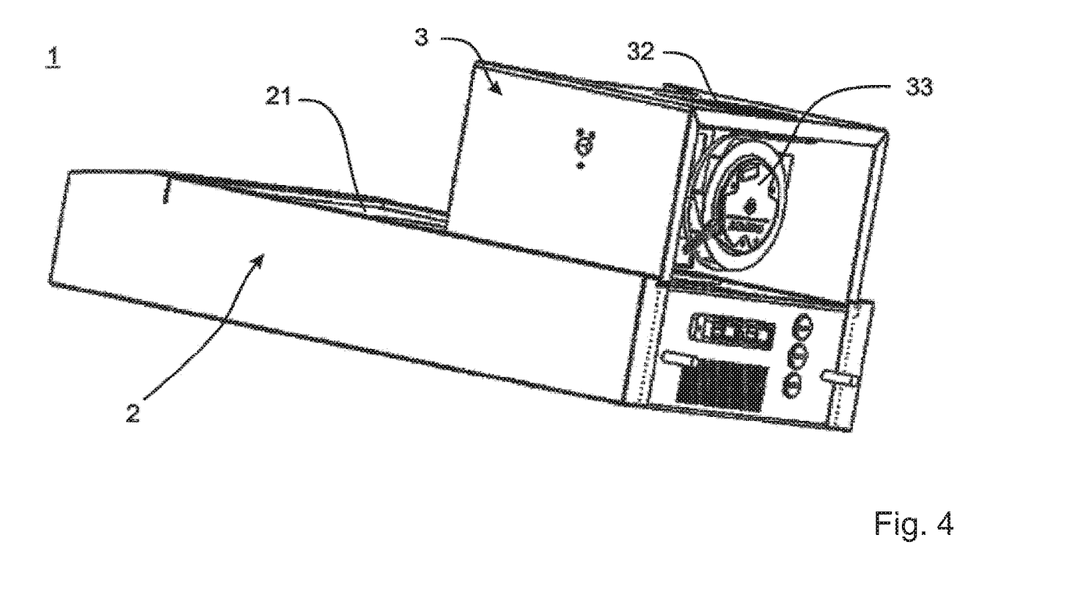
FIG. 4 schematically, a rear view of the heating device and of the filter device.

FIG. 4 shows a rear view of part of the heating device 2 and of the filter device 3. The rear covering panel of the filter device 3 has been removed. Within the filter device 3, it is now possible to see the fan 33, which is usually arranged along the final stretch of the exhaust-air stream, beneath the exit opening of the filter device 32. The fan 33 is arranged at the end of the exhaust-air stream since it constitutes a component which is relatively difficult to clean.

Figure 5:
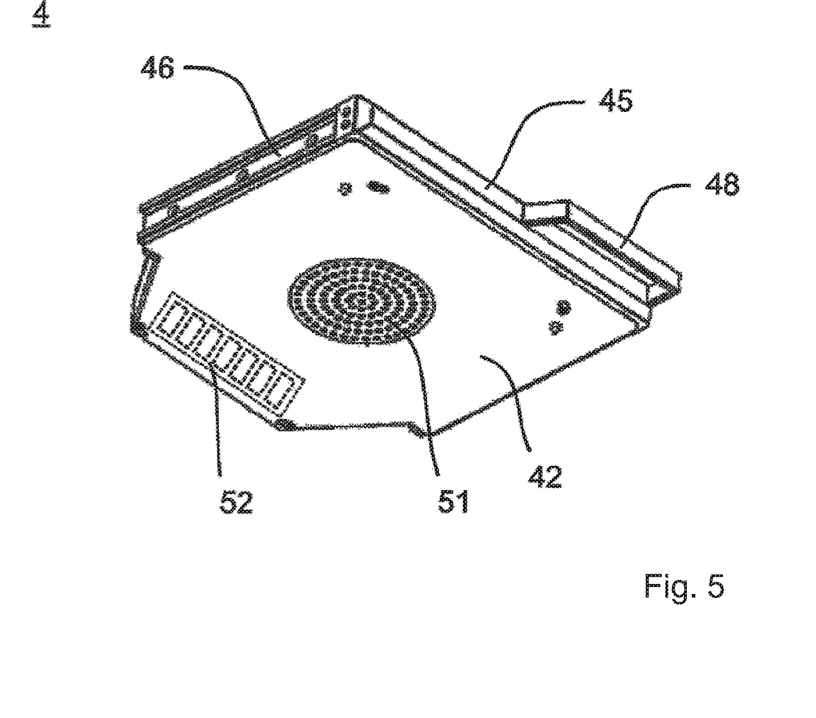
FIG. 5 shows, schematically, an oblique view of the cover device.

FIG. 5 shows, schematically, an oblique view of the cover device 4 in the form of a separate component. The entry opening of the flow channel 51 is arranged centrally on the underside 42. In the operating state, said entry opening of the flow channel 51 for receiving the fumes which arise during cooking is located centrally above the opening of a cooking vessel. On the turned-away, first side surface of the cover device 4, dashed lines indicate the exit opening of the flow channel 52, which during operation is arranged directly in front of the entry opening of the filter device. A handle 48, which can be conveniently operated using one hand, is mounted in an off-center state on the third side surface 45. The fourth side surface 46 exhibits the screw-connection location for a multi-arm mechanism.

Figure 6:
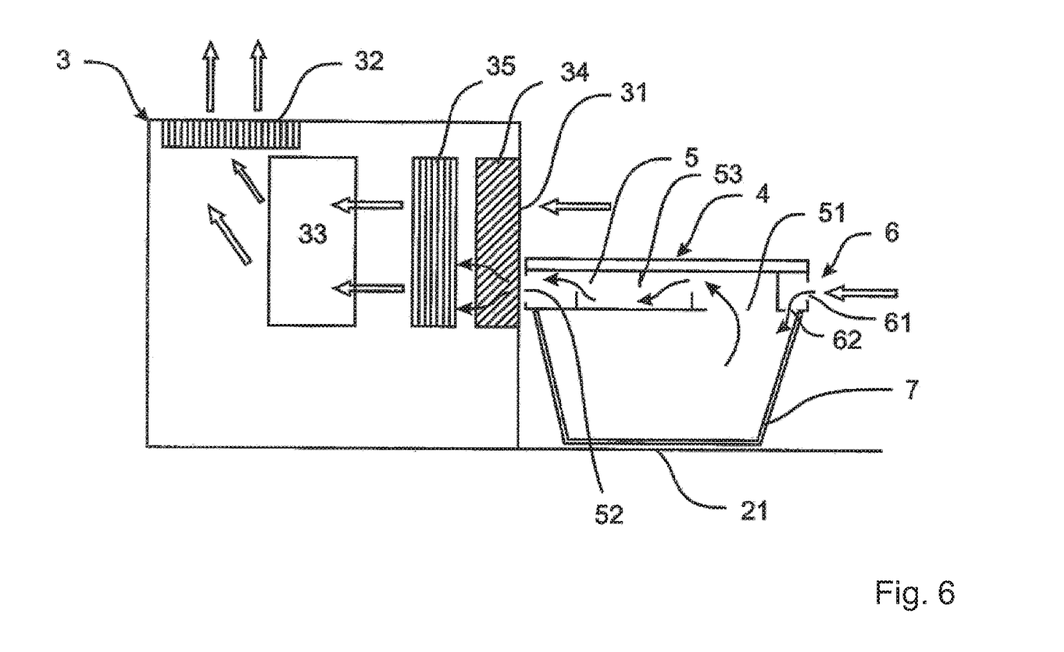
FIG. 6 shows, schematically, a view of the airflow in the filter device and in the cover device.

FIG. 6 shows, schematically, a view of the airflow in the filter device 3 and in the cover device 4 of the apparatus according to the invention. Of the heating device located therebeneath, only the hot plate 21 is indicated.

FIG. 6 shows the operating state. For this purpose, a pot 7 has been arranged on the hot plate 21. The steam produced in the pot 7 is directed via the entry opening of the flow channel 51. This is illustrated by arrows, which represent the flow of the exhaust air. The cover device 4 also comprises in this case, as a variant, a flow channel for additional supply air 6, said flow channel feeding the supply air from the surroundings into the interior of the pot 7 via a separate entry opening of the flow channel 61 and an exit opening of the flow channel 62. This air stream mixes with the steam produced in the pot 7 to give the exhaust-air stream, which is directed through the flow channel for exhaust air 5. Ribs 53, which provide for a multiple deflection of the exhaust-air stream and cause vortexing in the process, are located en route from the entry opening of the flow channel 51 to the exit opening of the flow channel 52. The multiple deflections extend the path traveled by the exhaust air. A vortex formation gives rise to an intensive exchange of heat with the channel wall, as a result of which the exhaust air is cooled to a sufficiently pronounced extent, even in the cover device 4, for fat-depositing purposes. The cover device 4 can be straightforwardly dismantled and reassembled for cleaning purposes.

Via the exit opening of the flow channel 52, said exit opening being arranged directly in front of the entry opening of the filter device 31, the exhaust air can be directed through a first filter 34, which for example in the first instance filters out the particles. Thereafter, the prefiltered exhaust air passes into a second filter 35, which, for example in the form of a carbon filter, removes unpleasant odors. Further on, the cleaned exhaust air is expelled by the fan 33, via the exit opening of the filter device 32, to the surroundings.

Figure 7:
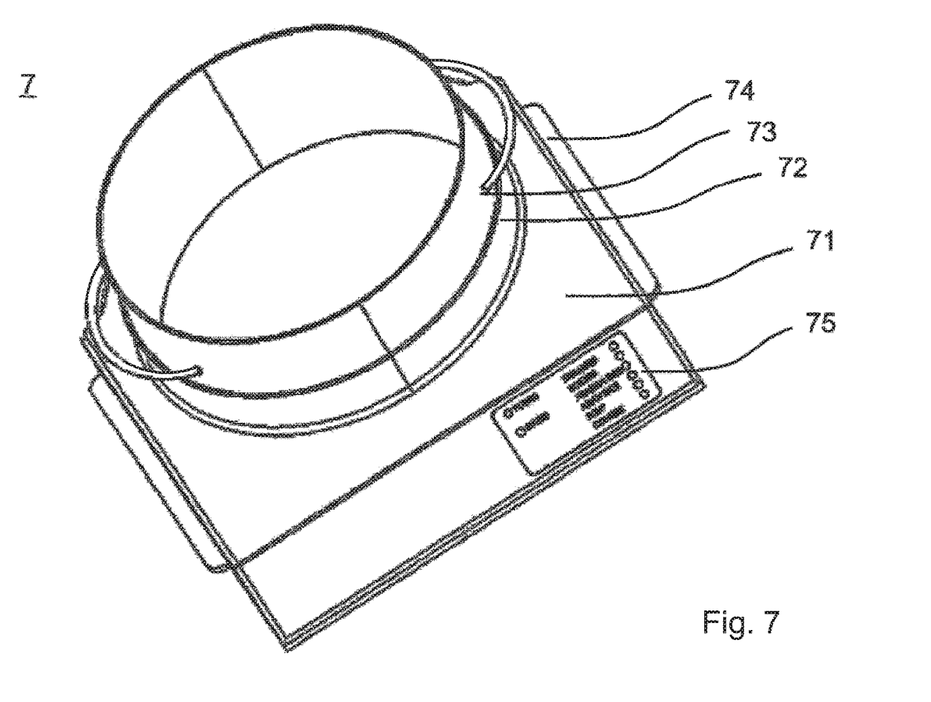
FIG. 7 shows, schematically, a view of a cooking vessel.

FIG. 7 shows, schematically, a view of a cooking vessel 7. This vessel is a rice cooker which, in the form of an Inductive App, is equipped with additional control electronics and an additional inductive component. For this purpose, these Inductive Apps have their own, dedicated controller, which, for handling purposes, corresponds with the controller of the hot plate. To this end, it is preferably also the case that the technical implementation and design of the operating panel of the heating device and the operating panel 75 of the cooking vessel correspond to one another, and that the two operating panels are directly adjacent. They therefore appear to the user, during operation, as a single unit.

In the case of the embodiment illustrated in FIG. 7, the cooking vessel 7 comprises a separate induction cooktop 71, on which the container 73 is arranged, and fixed securely, by means of a retaining ring 72. The strip-form handle 74 provides for reliable handling in order for the food to be introduced and removed again following cooking. Such additional equipment can also be used universally and provides effective use of the precious working space in an aircraft kitchen.

It is likewise conceivable for the separate induction cooktop 71 to be provided in the form of a passive component without its own control elements and heating elements, or just with elements for displaying an operating state.

Figure 8:
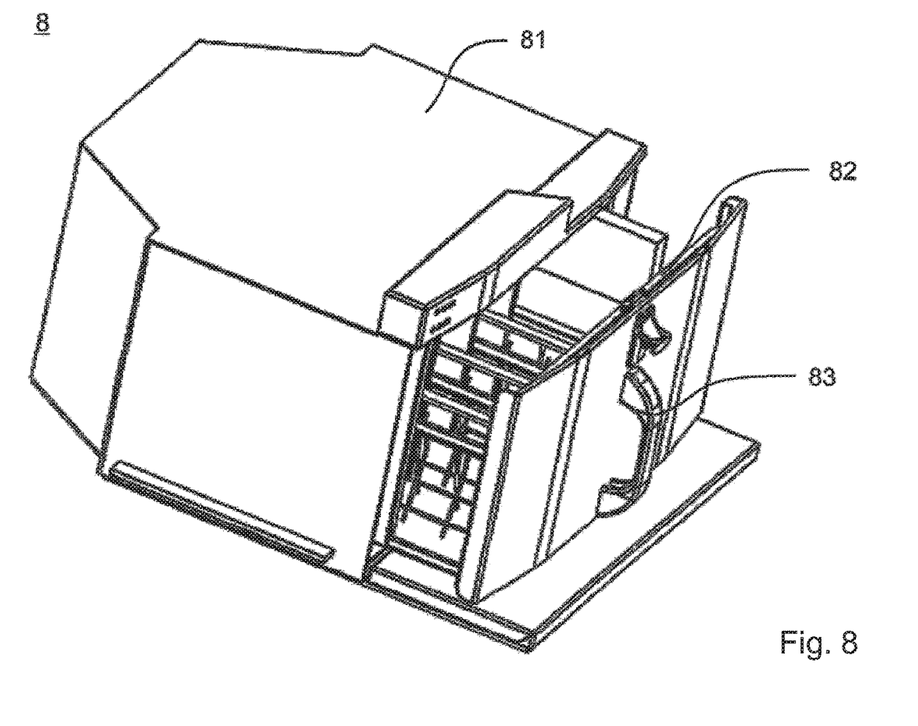
FIG. 8 shows, schematically, a view of a toaster device.

FIG. 8 illustrates, schematically, a view of a toaster device 8. The latter is likewise positioned, during use, between the heating device 2 and the cover device 4 and securely retained by a fixing component. The toaster device 8, in turn, forms an aforementioned Inductive App having a housing 81 and a pull-out toaster drawer 82, with an arresting device, in the housing 81. To provide for better handling, a handle 83 is mounted on the toaster drawer 82. It is also conceivable to provide an additional transport safeguard in the form of a hook or catch arranged laterally on the toaster device 8.

Figure 9:
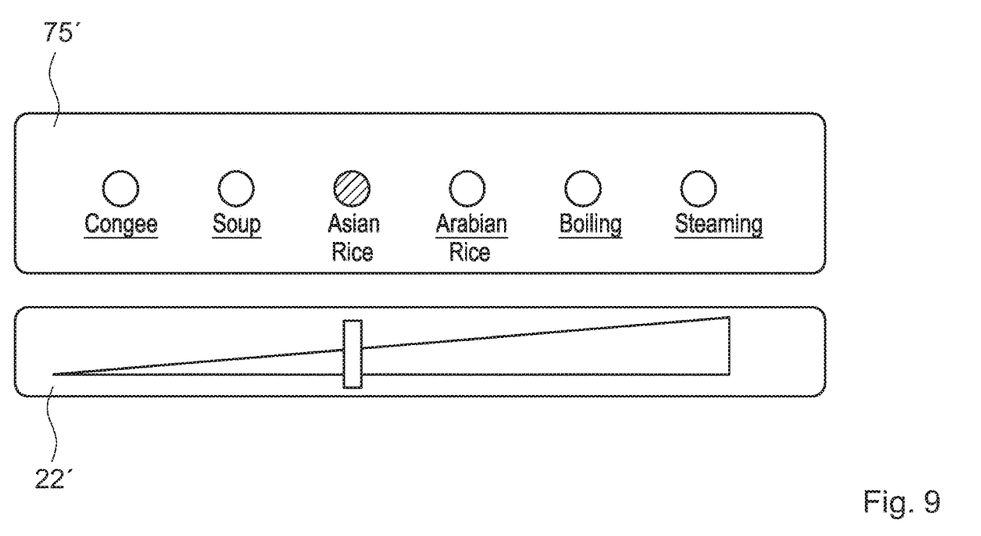
FIG. 9 shows, schematically, an operating device.

FIG. 9 shows an advantageous operating concept in particular for operating the cooking vessel 7 for preparing rice dishes. In the variant illustrated in FIG. 9, the operating panel 22' is designed in the form of a so-called slider, which can be powered by a user performing a swiping movement with his finger, and then lifting his finger off at the desired position, or performing a direct tapping action. The slider corresponds with a display panel 75', which is arranged on the rice cooker 7. The display panel 7, together with the slider, forms an integrated operating unit which can be operated intuitively.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for preparing food, the apparatus comprising:
   a heating device with a hot plate;
   a filter device; and
   a cover, which is in operative connection with the filter device, has an upper side, an underside that opposes the upper side, a first side surface, a second side surface, a third side surface that opposes the first side surface and a fourth side surface that opposes the second side surface, wherein the upper side is a top surface of the cover and the underside is a bottom surface of the cover, and wherein the first side surface, the second side surface, the third side surface and the fourth side surface extend from the upper side to the underside,
   wherein the underside of the cover has at least one entry opening of a flow channel for exhaust air, the flow channel being arranged in an interior of the cover, wherein the interior of the cover is enclosed by the upper side, the underside, the first side surface, the second side surface, the third side surface and the fourth side surface, and
   wherein the first side surface of the cover has an exit opening of the flow channel, such that the exhaust air flows into the cover at the at least one entry opening and exits the cover at the exit opening, and wherein the underside of the cover extends along a first plane and the first side surface of the cover extends along a second plane that intersects with and is angled with respect to the first plane, such that the at least one entry opening of the underside of the cover is angled with respect to the exit opening of the first side surface of the cover, wherein the cover is movable with respect to the filter device in order to align the exit opening of the cover with an entry opening of the filter device, such that the exhaust air flows via the exit opening of the cover into the entry opening of the filter device, wherein the cover is connected to the filter device by a first pivoting arm and a second pivoting arm, wherein one end of the first pivoting arm is pivotably connected to the filter device at a first connection point, such that a rotation axis of the first pivoting arm is centered on the first connection point, wherein another end of the first pivoting arm is pivotably connected to the second side surface of the cover at a second connection point, wherein one end of the second pivoting arm is pivotably connected to the filter device at a third connection point, such that a rotation axis of the second pivoting arm is centered on the third connection point and wherein another end of the second pivoting arm is pivotably connected to the fourth side surface of the cover at a fourth connection point, such that a rotation axis of the cover is centered on and extends between the second connection point and the fourth connection point, and wherein the first pivoting arm and the second pivoting arm enable the cover to be displaceable between multiple positions each at a different height from one another with respect to the hot plate in order to cover and retain cooking vessels of differing heights, and wherein in each of the multiple positions, the cover and the hot plate are maintained in parallel to one another.

2. The apparatus as claimed in claim 1, wherein the flow channel causes multiple deflections of the exhaust-air stream at least in some regions between the at least one entry opening of the cover and the exit opening of the cover.

3. The apparatus as claimed in claim 1, wherein a filter is arranged in the flow channel.

4. The apparatus as claimed in claim 1, wherein the cover has a flame barrier.

5. The apparatus as claimed in claim 1, wherein the cover is displaced between an open position and a closed position.

6. The apparatus as claimed in claim 1, wherein the filter device has a plurality of filters arranged one behind the other in a flow direction.

7. The apparatus as claimed in claim 6, wherein each of the plurality of filters are individually interchangeable.

8. The apparatus as claimed in claim 1, wherein the hot plate has an inductive heater.

9. The apparatus as claimed in claim 1, wherein a cooking vessel is arranged between the hot plate and the cover.

10. The apparatus as claimed in claim 9, wherein the cooking vessel is a pan, a pot, a wok, a steam cooker or an apparatus for preparing rice.

11. The apparatus as claimed in claim 1, wherein a toaster is arranged between the hot plate and the cover.

12. The apparatus as claimed in claim 1, wherein a cooking vessel or a toaster is arranged between the hot plate and the cover, and wherein the cooking vessel or the toaster is arrested on the heating device and/or the filter device and/or on the cover, and released again, by a retaining system.

13. The apparatus as claimed in claim 12, wherein the cover, in the closed position, arrests the cooking vessel or the toaster.

14. The apparatus as claimed in claim 1, wherein the entry opening of the filter device is elongated in a vertical direction such that the exit opening of the cover is alignable with the entry opening of the filter device when the cover is displaced into any one of the multiple positions each having the different height from one another with respect to the hot plate.

15. The apparatus as claimed in claim 14, wherein the entry opening of the filter device is elongated such that a portion of the entry opening receives exhaust air from the exit opening of the cover while another portion of the entry opening of the filter device receives surrounding air from outside of the apparatus.

16. The apparatus as claimed in claim 1, wherein the exit opening of the flow channel extends through the first side surface of the cover, the first side surface being an exterior surface of the cover, wherein the entry opening of the filter device extends through an exterior surface of the filter device, and wherein the first side surface of the cover opposes the exterior surface of the filter device when a cooking vessel is retained between the cover and the hot plate.

17. The apparatus as claimed in claim 2, wherein at least one rib projects into the flow channel, the at least one rib causing the multiple deflections of the exhaust-air stream.

18. The apparatus as claimed in claim 1, wherein the at least one entry opening of the cover is arranged centrally in the underside of the cover.

* * * * *